Patented Dec. 16, 1941

2,266,084

UNITED STATES PATENT OFFICE

2,266,084

SULPHONIC ACID COMPOUNDS AND THEIR PREPARATION

Alexander N. Sachanen, Arlie A. O'Kelly, and Pharez G. Waldo, Woodbury, N. J., assignors to Socony-Vacuum Oil Company, Incorporated, New York, N. Y., a corporation of New York No Drawing. Application May 23, 1940, Serial No. 336,714

17 Claims. (Cl. 260—504)

This application is directed to the preparation of mineral oil sulphonic acid compounds and related products, and particularly relates to the preparation of petroleum sulphonic acid compounds. This application is a continuation-in-part of our copending application S. N. 125,266, filed February 11, 1937.

When petroleum fractions are treated with sulphuric acid, particularly with strong acid or oleum, certain acidic materials partaking of the nature of the known sulphonic acid compounds are formed. These mineral oil sulphonic acids and their salts or sulphonates, which frequently are designated in the industry as "soaps," have long been important articles of commerce without, however, any specific or detailed knowledge of their exact character, manner of formation, differences between members of the group, variation of properties between members of the group, and the like, having been gained.

Prior practice in the preparation of these bodies and knowledge of their properties, may be shortly summarized as follows: Mineral oil is treated with strong sulphuric acid or oleum, either for refinement of the oil or specifically for production of sulphonic bodies, either in one stage or many stages, the resulting sludge being separated from the oil. The oil is then treated with an aqueous solution of an alcohol or acetone, before or after neutralization with alkali, and the sulphonic acids or sulphonic acid soaps recovered from the aqueous extract. The sulphonic acids thus recovered are commonly designated mahogany or brown acids, because of color, and are usually characterized by a solubility in oil which is much greater than their solubility in water. The sludge separated from the above operation, after dilution with water to remove most of the remaining sulphuric acid, may be extracted with oil for recovery of a further quantity of brown acids, which are then separated from the oil as outlined above. The remaining sludge upon digestion with water, with or without neutralization, yields sulphonic acids of another kind, whose compounds may be salted out of the resulting aqueous extract. Because of their color, these acids are known as green acids and generally exhibit the property of low solubility in oil, with better solubility in water. Various refinements of process, tending to give sulphonic acids and soaps more free from oil have been proposed, and attempts to modify relative solubility by mixing brown and green acids have been made, but no general knowledge has been attained leading to the ability to exercise control over the nature, preparation, and specific properties of sulphonic acids and compounds thereof. This invention is specifically directed to methods enabling controlled production of sulphonic acid products of predetermined characteristics.

It is an object of this invention to provide a method enabling the production of brown mineral oil sulphonic acid products of controlled solubility characteristics, of several kinds, each suited particularly for some one of the uses to which sulphonated products are put. Another object is the provision of a method for producing brown mineral oil sulphonic acid products of predetermined solubility properties. Still another object is the provision of certain novel brown mineral oil sulphonic acid products. One specific object is the production of a brown petroleum sulphonate which is highly water soluble and oil insoluble. Other objects are in part obvious and will in part appear from the following description of the invention.

This invention is based upon the discovery that with starting materials of controlled chemical nature and physical characteristics, sulphonated with controlled amounts of sulphonating agent of varying controlled strength, in a plurality of stages, followed by separation and isolation of the sulphonic acids produced in each stage of treatment, a series of compounds is produced, the properties of which have definite gradations throughout the series, that members of the series are in general more suitable for the usual uses of such compounds than those heretofore produced, and that many members of the series possess desirable properties to such an enhanced degree that they constitute, in fact, new compositions of matter not heretofore known. A feature of this invention, of utmost importance, is that it permits the production of sulphonic acid compounds manufactured to fit desired uses, rather than compelling the adaption of the desired use to the fortuitously occurring properties of the sulphonic acid compound.

The mineral oil to be used should contain a substantial amount of cyclic hydrocarbons, i. e., aromatics and/or naphthenes, as distinguished from non-cyclic or paraffinic compounds. Several petroleum oil products, as is well known, meet the above requirement, and we particularly prefer these petroleum oils.

One of the preferred starting materials of controlled nature are fractions obtained by distillation from solvent tars originating from the refining of lubricating fractions of petroleum. Solvent refining is a process wherein some solvent liquid, such as dichlorodiethyl ether, phenols, nitrobenzene, furfural or other liquid having a preferential solvent power for naphthenic constituents of petroleum oils is used to extract these constituents, leaving an oil of more highly paraffinic character. Such solvents alone may be used upon the distillates of paraffinic or mixed base stocks originating from Pennsylvania or Mid-Continent types of crudes. In company with a preferential solvent for paraffinic bodies, such as for example propane, similar separation may be made on residual lubricant fractions from those stocks or distillates from other stocks. In the above discussion the terms paraffinic and naphthenic are not used in the strict chemical sense, but in that adopted by the oil industry, paraffinic designating those classes of compounds exhibiting low rate of decrease of viscosity with increase of temperature, and naphthenic designating compounds with high rate. Solvent extracts as produced by the processes noted above are designated solvent tars. Solvent tars of the kinds produced from oils of paraffinic or mixed base origin are particularly useful for the purposes of this invention. The solvent tar selected is preferably subjected to distillation under vacuum and those fractions distilling over between temperatures of about 100° C. and 300° C. at an absolute pressure of about one inch of mercury are collected, and form the basic oil material for the preparation of sulphonic acids. This oil is rather highly aromatic in nature, and its desirable properties are exhibited in general, in somewhat varying degree, by oils of similar boiling point from solvent tars produced by any of the usual solvents. Similar fractions may be isolated by somewhat similar methods from some tars produced by cracking.

Other preferred petroleum oils for our invention comprise low viscosity neutral distillates containing substantial amounts of cyclic hydrocarbons, such as the distillates employed in the manufacture of transformer oils. These transformer oil stocks are particularly preferred for the manufacture of water soluble, oil insoluble brown sulphonates and such sulphonates are excellent wetting and penetrating agents, and, for the manufacture of such agents, the transformer oil stock that is to be sulphonated should have a pour point below 0° F. before dewaxing. Thus distillate oils containing a substantial amount of cyclic hydrocarbons, as for example, Coastal distillates, i. e., distillates from naphthenic crudes, having a viscosity between about 50 seconds and 100 seconds Saybolt Universal viscosity at 100° F. and having a pour point below zero degrees F. before dewaxing, may be sulphonated to produce a brown sulphonate product which is extremely water soluble and oil insoluble and when substantially freed of oil is an excellent wetting or penetrating agent.

We prefer sulfuric acid as the sulphonating agent although, as known, other agents may be used for sulphonating. The strength of the acid to be used depends upon the solubility desired in the resultant sulphonic acid product. Thus, we have found that when, for instance, the abovementioned solvent tar distillate fraction containing a substantial amount of cyclic hydrocarbons is subjected to successive treatments with sulphuric acid according to the following schedule, sulphonic acid products of different solubility properties are produced by the different treats.

| Treat number | Amount of acid, volume | Strength of acid, H₂SO₄ |
| --- | --- | --- |
|   | Percent | Percent |
| 1 | 10 | 94 |
| 2 | 10 | 98 |
| 3 | 10 | 103 |
| 4 | 10 | 103 |
| 5 | 10 | 103 |
| 6 | 20 | 103 |

Each treatment is conducted by agitation with the acid, followed by settling, separation, and withdrawal of the sludge formed. After removal of sludge is complete, the oil is treated with an aqueous extraction agent consisting of about equal parts of ethyl alcohol and water. Other solvents, as methyl alcohol or acetone may be used. The extracted sulphonic acids are then recovered from the solution either by distilling off solvent, or by any of the other usual methods, such as neutralization and salting out, etc., which may be applicable to the particular circumstances.

The sulphonic acid products so formed exhibit a gradation of properties from one end of the series to the other. Thus, for instance, the usual sulphonates, such as for example those of the alkaline group, of the sulphonic acids produced by sulphonation steps 3 and higher are increasingly oil-soluble, decreasingly water-soluble, substantially insoluble in water from step 6 on, inclusive. Those produced by steps 5 to 1 inclusive, (note reverse order), are increasingly water-soluble and decreasingly oil-soluble, and below 3 are substantially insoluble in oil. Those produced by steps 1 and 2, water-soluble, oil-insoluble, resemble in some respects the "green" acid sulphonates heretofore produced. Those produced by some of the higher steps resemble in some respects the "mahogany" or brown acid sulphonates heretofore produced. Both, however, differ from such former sulphonates in many respects.

By separately recovering the brown acid products resulting from treats of different intensities, we obtain products having only constituents of essentially the same solubility properties. In the above examples, sulphonates derived from the middle treats, e. g., treating steps 3, 4 and 5 contain essentially only components which are both water and oil soluble and, therefore, this product is particularly valuable, for uses which employ this type sulphonate. These sulphonic acids of treats 3, 4 and 5 and their soaps, being quite soluble in both oil and water, a mixture of these products, or any one of them, is found quite useful in the preparation of permanently stable emulsions of hydrocarbon oils with water of any usual degree of hardness or salinity. Obviously if a water and oil soluble product is desired, treats 3, 4 and 5 may be recovered together or separately, and, further, if "shading off" in solubility in either direction is desired, may be recovered with or mixed with sulphonates of appropriately different properties. The sulphonate product derived from treat 6 is essentially oil soluble and water insoluble consisting almost exclusively of such constituents.

Conversely, the sulphonates, as for example, the alkali metal sulphonates, of the sulphonic acids from the first two treats are highly water soluble and oil insoluble, and in this respect, might be said to resemble green sulphonates. However the sulphonates from treats 1 and 2 have a light brown or yellow color while green acids are, as the name indicates, green or even greenish black. Further green sulphonic acids are insoluble in the oil, as evidenced by their source, as also are the green sulphonates; while, on the other hand, the brown sulphonic acids of treats 1 and 2 are soluble in the oil while their sulphonates are insoluble in the oil. These water soluble, oil insoluble brown sulphonates when substantially freed from oil, which may be done in known manner, have proven to be exceptionally fine wetting and penetrating agents, particularly when produced from the abovementioned transformer oil stocks. Accordingly, if it should be desired to produce only this one product, it is obvious from the above, that the oil, such as we propose to use, only need be treated with acid of similar concentration to that of treats 1 or 2, in one or preferably a plurality of treats with or without separation between each treat, without continuing on through the rest of the series of treats at higher concentrations shown in the example. It will be noticed from the example that the point where the acid starts producing sulphonic acids whose sulphonates are both water and oil soluble rather than water soluble and oil insoluble, from the solvent tar distillate abovementioned, is somewhere between 98% acid and 103% acid. Accordingly it is clear that if only the water soluble, oil insoluble sulphonate is desired the acid in the treats must be maintained below the concentration at which oil soluble sulphonates are formed.

The acids produced by the several steps likewise exhibit a gradation of molecular weight increasing with the stage of treatment. In treating a 200°–300° C. (under 1 in.Hg) distillate from solvent tar, for instance, the acids from stages 3, 4, and 5, have molecular weights of the order of 350, and, of course, those of stages 1 and 2 have smaller molecular weights while those of stage 6 are larger. Since, therefore, molecular weight of the hydrocarbons also regulates the properties of the sulphonates, if best results are to be obtained in treating petroleum distillates containing a substantial amount of cyclic hydrocarbons according to our invention, distillates which are of more or less similar boiling range or viscosity to the solvent tar distillates or transformer oil stocks herein described should be used so that the compounds therein are of somewhat similar molecular weight, it being understood that heavier stocks may be used but will tend to give poorer yields of the water soluble, oil insoluble sulphonates and lighter stocks will tend to give poorer yields of the water insoluble, oil soluble sulphonates, since, if all the compounds in the oil being treated are, for instance, substantially heavier than the lighter cyclic compounds in the above preferred distillates, the "early stage" sulphonates will be less water soluble.

It is believed that the progressively graded differences in properties of the sulphonic acid compounds produced in this way depend upon the type of structure of the hydrocarbon oil involved. It is believed that those produced by the first stage operations are relatively more aromatic or cyclic than aliphatic in nature, and that as the sulphonation proceeds through succeeding stages, compounds of an increasingly aliphatic nature are sulphonated, i. e., cyclic compounds having much larger aliphatic side chains are sulphonated.

As has been noted hereinabove the sulphonic acids so produced arise from a starting material which is predominantly cyclic, viz, aromatic or naphthenic, in character, as distinguished from non-cyclic or paraffinic compounds and from asphaltic compounds. It is believed that the unique properties of most of the members of the series can be traced to their starting material, and are made evident by the method of preparation used.

As an example of a sulphonic acid preparation exhibiting to an unusual degree the valuable properties of mutual solubility in water and oil, the following may be noted.

Solvent tar produced by treatment of a lubricating oil distillate from Pennsylvania Crude with dichlorodiethyl ether was subjected to vacuum distillation under an absolute pressure of one pound per square inch of mercury, and those portions of the distillate coming over between 200° C. and 300° C. were collected together. This distillate was then treated with five successive treats of sulphuric acid using one part acid to ten parts oil, by volume, in each treatment, the first being conducted with acid containing 94% $H_2SO_4$, the second with 98% acid, and the last three with 103% acid. In each step, after agitating the acid and oil, the sludge was allowed to settle, separated, and discarded, and the oil was treated with about 10% by volume of an extractive solvent consisting of about equal parts of ethyl alcohol and water. The extracts from the fourth and fifth treatments were combined, neutralized with NaOH, and the water and alcohol were removed by distillation. The resulting sulphonic acid soap was very light in color, yellow, of a consistency ranging from very viscous liquid to spongy solid depending upon the quantity of water remaining, and having only about 5% of oil. It was indicated, by examination, that the sulphonic acids present were possessed of a molecular weight of about 350. This sodium soap was found to be readily soluble in both oil and water, and particularly suitable for the preparation of so-called soluble oils, or mineral oil fractions emulsifiable in water. Since the calcium soaps of these acids are water-soluble to a high degree, the oils so made are permanently emulsifiable even in water of unusual hardness, very stable emulsions being formed even in water containing as much as 1 or 2 grams of calcium chloride (anhydride) per liter of water.

In order to further illustrate the invention with particular respect to the formation of water soluble, oil insoluble brown sulphonates, the following data is given:

| Type oil | Saybolt Universal viscosity at 100° F. | Sulphuric acid used in treat per bbl. of oil. | Property of sodium sulphonate of sulphonic acids. |
| --- | --- | --- | --- |
|  | *Seconds* |  |  |
| Coastal distillate. | 54 to 59 | 43 lbs. of 93% acid (added in a plurality of treats). | Highly water soluble and oil insoluble. |
| Do | 54 to 59 | 70 lbs. of 98% acid (added in a plurality of treats). | Do. |
| Do | 72 to 79 | 50 lbs. of 98% acid (added in a plurality of treats). | Do. |

The water soluble, oil insoluble brown sulphonates and the sulphonic acids from which they are derived possess such different characteristics from those encountered in the ordinary or conventional brown sulphonic acid products that they are best recovered from the acid treated oil stock by means of an "acid jelly." Thus, after the oil is sulphonated and settled to separate sludge, the remaining sour oil is treated with a small amount of water, e. g., 1%, whereby an "acid jelly" is formed in the oil. This "acid jelly" which contains the brown sulphonic acid products in question, is settled and separated from the oil. After separation the "acid jelly" is neutralized and then permitted to settle whereby the neutralized mixture separates into three layers, viz., a top oil layer, a middle emulsion layer and a lower aqueous layer containing the brown sulphonates. The lower aqueous layer is carefully withdrawn, treated with naphtha to extract substantially all remaining oil, and then the brown sulphonates are salted out yielding a product which consists of brown sulphonates and water with a negligible amount of oil and a minor amount of salt. The slimy salted out product is preferably dried directly for a finished product in the form of either flakes or powder, however, the slimy material may be redissolved in water for a finished product in the form of an aqueous solution.

It is to be understood that the examples and specific data herein set forth are disclosed for the purposes of illustration only, and that the invention is not understood to be limited thereby or thereto, but is only subject to such limitations as may be expressed in the appended claims.

We claim:

1. A process for the production of mineral oil sulphonic acids comprising the following steps: Sulphonating a mineral oil fraction boiling in the range of from about 100° C. to about 300° C. at about 1 inch mercury absolute pressure which is relatively free of paraffinic constituents and asphaltic constituents with successive treatments of sulphuric acid, using acid of only sufficient strength to produce water-soluble brown sulphonic acid products at first then increasing the strength of the acid treats to produce water-insoluble brown sulphonic acid products, and separately recovering from the oil brown sulphonic acid products produced by treats of different intensities, whereby a series of sulphonic acid products are obtained which differ from one another in properties.

2. A process for the production of mineral oil sulphonic acid products of varying solubilities in oil and water comprising the following steps: Treating a lubricant fraction with an extractive solvent to separate therefrom a solvent tar consisting predominantly of the naphthenic constituents present in said oil, subjecting the solvent tar to non-cracking distillation, collecting the distillate portions thereof boiling at temperatures in the range of 200–300° C. at 1 inch mercury absolute pressure, subjecting the collected distillate to successive treatments with controlled amounts of sulphuric acid of controlled strength, at least some of said treatments being of different intensity, separating and removing sludge and free acid after each treatment, and after each treatment separately recovering the sulphonic acids remaining in the oil at that stage, the series of sulphonic acid products so recovered differing one from another in properties.

3. A process for the production of mineral oil sulphonic acid products of varying solubilities in oil and water comprising the following steps: Treating a lubricant fraction of a paraffinic base or mixed base crude with an extractive solvent to separate therefrom a solvent tar consisting predominantly of the naphthenic constituents present in said oil, subjecting the solvent tar to non-cracking distillation, collecting the distillate portions thereof boiling at temperatures in the range of 200–300° C. at 1 inch mercury absolute pressure, subjecting the collected distillate to successive treatments with controlled amounts of sulphuric acid of controlled strength, at least some of said treatments being of different intensity, separating and removing sludge and free acid after each treatment, and after each treatment separately recovering the sulphonic acids remaining in the oil at that stage, the series of sulphonic acid products so recovered differing one from another in properties.

4. A process for the production of mineral oil sulphonic acid bodies highly soluble in both oil and water comprising the following steps: Treating a lubricant fraction of a paraffinic base or mixed base crude with an extractive solvent to separate therefrom a solvent tar consisting predominantly of the naphthenic constituents present in said oil, subjecting the solvent tar to non-cracking distillation, collecting the distillate portions thereof boiling at temperatures in the range of 100–300° C. at 1 inch mercury absolute pressure, subjecting the collected distillate to successive treatments with controlled amounts of sulphuric acid of controlled strength, at least some of said treatments being of different intensity, separating and removing sludge and free acid after each treatment, and after each treatment separately recovering the sulphonic acids remaining in the oil at that stage, the series of sulphonic acid products so recovered exhibiting high water solubility and low oil solubility in the first stages, progressively changing to low water solubility and high oil solubility in the latest stages, and collecting the one or more intermediate stage products exhibiting relatively high solubility in both oil and water.

5. The process of claim 1 in which the acid treatment is by successive volumes of acid each amounting to about 10% by volume of the oil treated and in which the strength of the acid, expressed as per cent $H_2SO_4$ is about 94% in the first treatment, 98% in the second treatment, and 103% in succeeding treatments.

6. The process of claim 2 in which the said acid treatment is by successive volumes of acid each amounting to about 10% by volume of the oil treated and in which the strength of the acid, expressed as per cent $H_2SO_4$ is about 94% in the first treatment, 98% in the second treatment, and 103% in succeeding treatments.

7. The process of claim 3 in which the acid treatment is by successive volumes of acid each amounting to about 10% by volume of the oil treated and in which the strength of the acid, expressed as per cent $H_2SO_4$ is about 94% in the first treatment, 98% in the second treatment, and 103% in the succeeding treatments.

8. The process of claim 5 in which the acid treatment is by successive volumes of acid each amounting to about 10% by volume of the oil treated and in which the strength of the acid, expressed as per cent $H_2SO_4$ is about 94% in the first treatment, 98% in the second treatment, and 103% in succeeding treatments, and the desired sulphonic acid product is a mixture of those separated as a result of the fourth and fifth treatment stages.

9. A mineral oil sulphonic acid body highly soluble in both oil and water, prepared by treating a lubricating oil distillate from Pennsylvania Crude oil with dichlorodiethyl ether to separate naphthenic constituents therefrom, freeing the extract of solvents to form a solvent tar, subjecting said tar to distillation under an absolute pressure of the order of 1 inch of mercury absolute, collecting the distillate portions boiling between about 100° C. and about 300° C. subjecting the distillate to five successive treatments with sulphuric acid, each with about one part of acid by volume to about ten parts of oil, using acid of about 94% H₂SO₄ in the first treat, 98% acid in the second treat, and 103% acid thereafter, recovering the brown sulphonic acids remaining in the oil from the fourth and fifth treats separately from such sulphonic acids produced by the first three treats to produce a combined product of said sulphonic acids of the fourth and fifth treats, which combined product is both water-soluble and oil-soluble.

10. The process of producing brown sulphonic acid products of different solubilities which comprises treating an oil containing a substantial amount of cyclic compounds to sulphonating treatments of different intensities and recovering separately from each other brown sulphonic acid products produced by treatments of different intensities.

11. The process of producing a series of brown sulphonic acid products ranging from oil-insoluble to oil-soluble products which comprises subjecting a mineral oil to a series of sulphonation treatments with sulphuric acid, using acid of only sufficient strength to produce water-soluble, oil-insoluble brown sulphonic products at first, and then increasing the strength of the acid used for treats to produce oil-soluble brown sulphonic products, and recovering brown sulphonic acid products produced by treats of different intensities separately from each other.

12. The process of producing brown sulphonic acid products which are highly water-soluble and relatively oil-insoluble comprising sulphonating a petroleum solvent tar containing a substantial amount of cyclic compounds of suitable molecular weight with sulphuric acid of sufficient strength to produce brown sulphonic acid products which are highly water-soluble and oil insoluble but of insufficient strength to produce any substantial amount of brown sulphonic acid products which are relatively oil-soluble and recovering such water-soluble brown sulphonic acid product separately from any relatively oil-soluble brown sulphonic acid products.

13. A process for the production of mineral oil sulphonic acid products which comprises sulphonating a petroleum solvent tar containing a substantial amount of cyclic compounds with successive treatments of sulphuric acid, using acid of only sufficient strength to produce water-soluble, oil-insoluble brown sulphonic products at first, and then increasing the strength of the acid used for treats to produce oil-soluble brown sulphonic products and recovering brown sulphonic acid products produced by treats of different intensities separately from each other.

14. The process of producing brown mineral oil sulphonic acid products which comprises sulphonating a suitable petroleum fraction containing a substantial amount of cyclic hydrocarbons with a sulphonating agent of sufficient strength to produce brown sulphonic acids, sulphonates of which are highly water soluble and oil insoluble, but of insufficient strength to produce any substantial amount of essentially different brown sulphonic acids, sulphonates of which are relatively oil soluble, removing substantially all oil from the so produced brown sulphonic acid product, and recovering the substantially oil-free brown mineral oil sulphonic acid product comprising essentially only sulphonic acid products derived from said sulphonation treatment.

15. The process of producing brown petroleum sulphonates which are highly water soluble and substantially oil insoluble which comprises sulphonating a transformer oil stock containing a substantial amount of cyclic hydrocarbons, and possessing a pour point below 0° F. before dewaxing, with sulphuric acid of sufficient strength to form only brown petroleum sulphonic acids, sulphonates of which are highly water soluble and substantially insoluble in the oil, but of insufficient strength to produce any substantial amount of essentially different sulphonic acids, sulphonates of which are relatively oil soluble, forming water soluble, oil insoluble sulphonates of the sulphonic acids so produced, removing substantially all oil from such sulphonates, and recovering a substantially oil-free water soluble, oil insoluble brown petroleum sulphonate product comprising such sulphonates.

16. A substantially oil-free mineral oil brown sulphonate product which is highly water soluble and oil insoluble produced by sulphonating a suitable mineral oil containing a substantial amount of cyclic hydrocarbons with a sulphonating agent of sufficient strength to produce brown sulphonic acids, sulphonates of which are highly water soluble and oil insoluble, but of insufficient strength to produce any substantial amount of essentially different brown sulphonic acids, sulphonates of which are relatively oil soluble, forming sulphonates of the sulphonic-acids so produced, removing substantially all oil from such sulphonates, and recovering a substantially oil-free water soluble, oil insoluble brown mineral oil sulphonate product comprising said latter sulphonates.

17. A substantially oil-free petroleum oil brown sulphonate product which is highly water soluble and oil insoluble produced by sulphonating a transformer oil stock containing a substantial amount of cyclic hydrocarbons, and having a pour point below 0° F. before dewaxing, with sulphuric acid of sufficient strength to produce brown sulphonic acids, sulphonates of which are highly water soluble and oil insoluble, but of insufficient strength to produce any substantial amount of essentially different brown sulphonic acids, sulphonates of which are relatively oil soluble, forming sulphonates of the sulphonic-acids so produced, removing substantially all oil from such sulphonates, and recovering a substantially oil-free water soluble, oil insoluble brown mineral oil sulphonate product comprising said latter sulphonates.

ALEXANDER N. SACHANEN.
ARLIE A. O'KELLY.
PHAREZ G. WALDO.